United States Patent Office 3,427,322
Patented Feb. 11, 1969

3,427,322
PREPARATION OF CYANOETHERS
Perry A. Argabright, Littleton, and David W. Hall, Englewood, Colo., assignors to Marathon Oil Company, Findlay, Ohio, a corporation of Ohio
No Drawing. Filed Feb. 3, 1964, Ser. No. 342,224
U.S. Cl. 260—340.6    8 Claims
Int. Cl. C07d 5/04; C07c 121/06

This invention relates to the preparation of cyanoethers and more particularly to the preparation of cyanoethers from α-haloethers and alkali cyanides.

Gauthier [Ann., 16, 289 (1904), and Compt. Rend., 143, 831 (1906)] showed α-chloroethers to be nonreactive with alkali metal cyanides. J. H. Barber et al [J. App. Chem., 3, 266 (1953)] showed that contrary to the work of Gauthier, potassium cyanide would displace the methyl halogen of 2,4-dichlorophenyl chloromethyl ether to form 2,4-dichlorophenoxy acetonitrile in aqueous acetone. This lack of reactivity on the part of the alkali metal cyanides is in contrast to the reactivity of mercuric cyanide and silver cyanide (Chem. Rev., 55, No. 2, p. 326).

We have now discovered that, in marked contrast to the low yields found by Barber et al., we are able to react alkali cyanides with α-haloethers in the presence of aprotic solvents whereby the halogen substituent is displaced by a cyano radical.

Ethers useful in this process have one halogen atom on a carbon atom alpha to the ether oxygen. Preferably, the halogen is chloro, bromo, or iodo. The ethers can be otherwise substituted by groups which do not react or complex either with the solvent, the cyanide, or the ether in such a manner as to retard displacement under reaction conditions. As noted above, operative ethers have a halogen substituent alpha to an ether oxygen. Where the substituted moiety is larger than halomethyl, the best yields are obtained where the carbon atom, beta to the ether oxygen, does not bear acidic hydrogens. Thus, larger yields of product are obtained from 2-chloro-3,3-dimethyl-1,4-dioxane than are obtained from 2-chloro-1,4-dioxane. Thus, the ether can be substituted by—for example, ester, ether, or alcohol—groups.

Examples of useful ethers include bis(chloromethyl) ether; bromomethyl methylether; iodomethyl methylether; 2-chloro-1,4-dioxane; α-chloroethyl-benzyl ether; 2 - bromo-3,3-dimethyl-1,4-dioxane; chloromethyl-benzyl ether; 2 - chloro - 3,3 - diethyl tetrahydrofuran; α-chloro-α-phenylmethyl-methyl ether; 1,3-dichloroisobenzo dihydrofuran; α - chloro - α - naphthyl-methyl-methylether; chloromethyl phenyl ether; α- or β-methoxyethyl chloromethyl ether; and 1,2-bis (chloromethoxy) ethane. Of the alkali cyanides, calcium, sodium, potassium, and lithium cyanides are preferred while sodium and potassium are our particular preference.

Solvents necessary for this process are, in general, nonreactive, aprotic solvents of high dielectric constant. These solvents include the lower dialkylsulfoxides, such as dimethylsulfoxide; lower N,N-dialkylformamides, such as N,N-dipropylformamide; lower dialkyl sulfones, such as dimethylsulfone; lower dialkyl lower alkyl amides, such as dimethylacetamide; hexa-lower alkyl phosphoramides, such as hexamethyl phosphoramide; N-lower alkyl pyrrolidones, such as N-methyl pyrrolidone; and nitriles, such as acetonitrile. The solvents should, of course, be liquid at reaction temperatures. Preferably, lower alkyl includes alkyl hydrocarbons having 1–3 carbon atoms. Of these solvents, dimethylformamide and dimethylsulfoxide are preferred.

The preparation of cyanoether progresses rapidly at room temperatures, though higher and lower temperatures; for example, from about −20 to about 30 or 40° C., are useful. Anhydrous conditions eliminate hydrolysis of haloethers. Small amounts of water can be tolerated but cut down the over-all yields. An excess of solvent, over that required to dissolve the organic reactant(s), is preferred as side reactions apparently decrease as the solvent:reactant ratio increases. A preferred solvent volume to reactant mole ratio is about 200 to 2000:1.

The reaction rate is apparently governed by the rate in which the alkali cyanides, usually slightly soluble in the reaction solvent, contact the solute. This rate is governed, in part, by the amount of alkali cyanide surface area exposed to the solvent, the stirring rate, and solute concentration.

Our process enables us to prepare compounds which have not been prepared heretofore; for example, bis(α-cyanoaliphatic hydrocarbon) ethers. Thus, we can prepare bis (cyanomethyl) ether which can be converted to the corresponding diamine or to diglycolic acid by known techniques. The acids and amines formed from our novel cyanoethers find utility in the preparation of polyamides and polyesters. The novel symmetrical dicyano alkane ethers having 4–12 carbon atoms are preferred for this purpose.

Example I

To a stirred slurry of 6.13 gm. of sodium cyanide (0.125 mole) in 20 ml. of dimethylformamide (DMF) under nitrogen was added, dropwise, a 5 ml. solution of 8.05 gm. of chloromethyl ether (0.100 mole) in DMF. The addition rate was adjusted such that a temperature of 20° C. could be maintained with ice bath cooling. After the addition was complete (0.5 hr.), a sample was removed by means of a micro hypodermic syringe through a rubber serum cap and analyzed by gas chromatography. A 95% yield was indicated. The reaction mixture was then filtered under nitrogen to remove the inorganic salts and the filtrate distilled at 20–22 mm. through a semi-micro spinning band column to provide 4.4 gm. of methoxyacetonitrile which represents a 62% yield. Redistillation provided a product whose boiling point, refractive index, and infrared spectrum were identical to that of methoxyacetonitrile.

Example II

To a stirred slurry of 6.12 gm. of sodium cyanide (0.125 mole) and 15 ml. of DMF was added, dropwise, a solution of 5.47 gm. of bis (chloromethyl) ether (0.05 mole) in 10 ml. of DMF. The reaction was quite exothermic, and cooling was required to maintain the temperature below 20° C. The reaction mixture was stirred for an additional 3 hours at room temperature, then filtered. After removing the solvent in high vacuum, a water-white, viscous oil distilled over and subsequently solidified. The condensed matter in the condenser and receiver was recrystallized from diethyl ether and was shown to be bis (cyanomethyl) ether having a melting point of 38.0–39.0° C.

The infrared spectrum show absorption at 9.05μ (ether linkage) and no absorption at 4.40μ (C≡N) typical of α-cyanoethers. NMR showed all four hydrogens equivalent since the scan showed only one sharp line at 6.45τ.

Elemental analysis.—Calculated for $C_4H_4N_2O$: C, 50.00; H, 4.20; N, 29.20; molecular weight, 96.0. Found: C, 50.20; H, 4.25; N, 29.36; molecular weight, 97.5 (cryoscopic in benzene).

Example III

To obtain 2,5-dicyano tetrahydrofuran, 5 moles of lithium cyanide are contacted with a dilute solution of 1 mole 2,5-dichloro tetrahydrofuran in N-methyl pyrrolidone at −20° C. for several hours. The solvent is distilled from the reaction mixture under high vacuum and the residue recrystallized from ether to obtain the dicyanide.

Example IV

Sodium cyanide (5 moles) is contacted with a mole of α-chloroethyl isobutyl ether in dimethylformamide solution at 20° C. for 5 hours. The reaction mixture is then vacuum distilled to remove the solvent. The α-cyanoethyl isobutyl ether is recrystallized in ethyl ether until pure.

Example V

Iodomethyl ethyl ether is contacted with finely ground potassium cyanide (5 moles) while dissolved in hexamethyl phosphoramide for a few hours to form cyanomethyl ethyl ether. The reaction mixture is then distilled under high vacuum to free the desired product which is purified by repeated recrystallization in ether.

Example VI

Following the procedure of Example V, cyanomethyl ethyl ether is prepared from sodium cyanide and bromomethyl ethyl ether.

Now having described our invention, what we claim is:

1. The process for the preparation of cyanoethers comprising reacting with an alkali cyanide an ether dissolved in an inert, substantially anhydrous, aprotic solvent of high dielectric constant; said ether being substituted on the carbon atom alpha to an ether oxygen with a halogen selected from the group consisting of iodine, bromine, and chlorine.

2. The process of claim 1 wherein the ratio of solvent volume per mole of haloether is at least 200:1.

3. The process of claim 2 wherein the ratio of solvent volume per mole of reactant is from about 200 to about 2000.

4. The process of claim 1 wherein the alkali cyanide is reacted with the haloether at temperatures of from about −20 to about 40° C.

5. The process of claim 1 wherein the alkali cyanide is an alkali metal cyanide.

6. The process of claim 1 wherein the alkali cyanide is selected from the group consisting of calcium, sodium, potassium, and lithium cyanides.

7. The process of claim 1 wherein the alkali cyanide is selected from the group consisting of sodium and potassium cyanides.

8. The process for the preparation of cyanoethers comprising reacting with an alkali cyanide an ether dissolved in an inert, substantially anhydrous, aprotic solvent of high dielectric constant; said ether being substituted on the carbon atom alpha to an ether oxygen with a halogen selected from the group consisting of iodine, bromine, and chlorine and said aprotic solvent being selected from the group consisting of lower dialkyl sulfoxides, lower N,N-dialkylformamides, lower dialkylsulfones, lower dialkyl lower alkylamides, hexa-lower alkylphosphoramides and N-lower alkylpyrrolidones.

References Cited

FOREIGN PATENTS 877,451   5/1953   Germany.

OTHER REFERENCES

Barber, "Journal of Applied Chemistry," vol. 3, 1953, pp. 270, 273. TP–1–J91.

Migrdichian, "The Chemistry of Organic Cyanogen Compounds," 1947 A.C.S. Monograph Series No. 105, p. 130. QD–181–C15M5.

Summers, "Chemical Reviews," vol. 55, 1955, p. 326. QD–1–A563.

JOSEPH P. BRUST, *Primary Examiner.*

U.S. Cl. X.R.

260—465, 465.6, 346.1, 346.2